April 18, 1961 F. D. LAKINS ET AL 2,979,804
STOCK PUSHER
Filed July 15, 1959
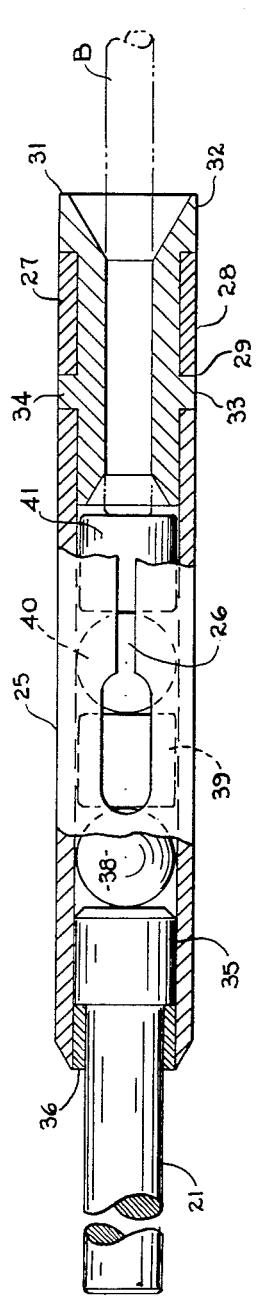
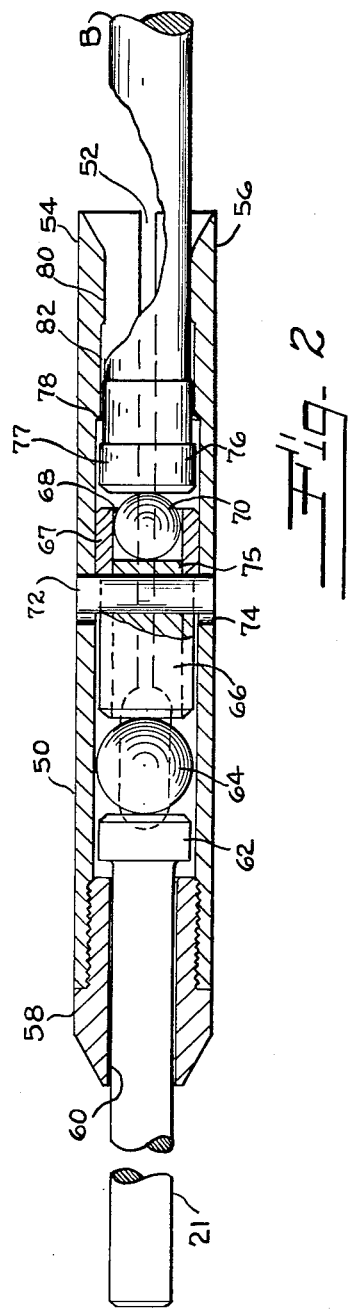
INVENTOR.
FRANKLIN D. LAKINS
GERALD B. LANPHERE
BY D. Emmett Thompson
Attorney United States Patent Office 2,979,804
Patented Apr. 18, 1961

2,979,804

STOCK PUSHER

Franklin D. Lakins and Gerald B. Lanphere, Syracuse, N.Y., assignors to Lipe-Rollway Corporation, Syracuse, N.Y., a corporation of New York Filed July 15, 1959, Ser. No. 827,361

4 Claims. (Cl. 214—1.5)

It is an object of this invention to provide a new and improved collet type stock pusher for bar feeding machines.

This application is a continuation-in-part of our copending application No. 698,820 filed November 25, 1957, now Patent Number 2,906,003, and as is set forth in that application it is desirable in certain applications to move the bar stock end piece or remnant rearwardly in the bar feeding machine to eject the remnant from the rear of the bar feeding machine.

This necessitates a stock pusher which will grip the bar end or remnant in order to retract or move the remnant rearwardly in the bar feeding machine feed tube upon rearward movement of the bar feed pushing structure.

Accordingly, it is desirable that the collet type stock pusher be designed to accommodate bar stock of varying diameter but yet at the same time grip the bar stock with sufficient force to effect retraction of the bar end or remnant. In addition, it is also necessary that the stock pusher be designed so as to permit the bar stock to rotate while being fed into the bar working machine which machine causes the rotation of the bar stock.

Accordingly, it is a more specific object of this invention to provide a new and improved collet type stock pusher which will accommodate bar stock of varying diameter and permit rotation of the bar stock without causing excessive wear on the pusher.

The invention consists in the novel features and in the combinations and construction hereinafter set forth and claimed.

In describing this invention, reference is had to the accompanying drawings in which like characters designate corresponding parts in all the views.

In the drawings—

Figure 1 is an elevational view with parts broken away and parts in section of one embodiment of the invention, and Figure 2 is a view similar to Figure 1 of the preferred embodiment of the invention.

Referring to Figure 1, it will be seen that the collet type stock pusher is made up of a metallic spring metal casing 25 which is formed at its forward end with a pair of axially sawed slots 26. The slots 26 form at the forward end of the casing 25 a pair of spring fingers 27 and 28 which are provided with square apertures 29. A 2-piece jaw arrangement consisting of jaws 31 and 32 are mounted in the fingers 27 and 28 by means of the upstanding lugs 33 and 34 formed on the jaws 31 and 32, respectively, and the lugs 33, 34 are also square in cross-section and are received in the apertures 29 thereby providing a yieldable collet to receive the rear end of the bar stock B. The bar working machine pusher or rod 21 is formed at its forward end with an enlarged head 35 which is held in the casing 25 by means of the bushing 36 suitably affixed to the rearward end of the casing 25 as by welding, or the like. Adjacent the head 35 is a ball bearing 38 and a spacer 39 and another ball bearing 40, and stop 41 whereby the sleeve 25 is free to rotate with the rotating bar B on the pusher rod 21.

As will be obvious, when the collet 25 is moved forwardly into the loading section of the bar feed guide tube of the bar feeding machine, the collet jaws 31 and 32 which are formed with a taper at their forward ends, as best seen in Figure 1, will enclose and grip the rear end of the bar B. When the bar B is exhausted so that only a bar end or remnant remains, the remnant will be gripped by the jaws 31 and 32 of the collet 25 so as to move the remnant rearwardly out of the loading section of the bar feed guide tube and away from the bar working machine into the breech section of the bar working machine upon rearward movement of the pusher rod 21.

As set forth in our copending application above-referred to, the remnant is moved rearwardly or to the left, as viewed in Figures 1 and 2, to permit the remnant to be ejected from the rear of the bar feeding machine.

The preferred embodiment of the invention, shown in Figure 2, includes the cylindrical collet sleeve or casing 50 provided with an axially extending sawed slot 52. The slot 52 forms a pair of radially opening and closing spring fingers 54 and 56 at the forward end of the collet sleeve 50. The rearward end of the collet sleeve 50 has a collet nut 58 threadedly mounted therein and the collet nut 58 is provided with a bore 60 in which the forward end of the pusher rod 21 is received. The inner end of the rod 21 is formed with an enlarged head 62 which serves to prevent the rod 21 from moving out of the collet nut 58. Positioned forwardly of the head 62 is a ball bearing 64 and a stop 66.

The stop 66 is provided at its forward end with an enlarged portion 67 which is formed with a drilled hole 68 which forms a bearing seat for a ball bearing 70. The stop 66 is provided intermediate its ends with a pin 72 which extends completely through the stop 66 and into a pair of elongate apertures 74 formed in the collet sleeve 50 in which the outer ends of the pins 72 are received. The stop 66 is also provided with a central axially extending hardened plug 75 to minimize the wear between the bearings 64 and 70 and the stop 66.

A second stop 76 having an enlarged portion 77 is positioned forwardly of the ball bearing 70. The forward end of the sleeve 50 is formed with a radially inwardly extending internal shoulder 78 which acts against the enlarged portion 77 to retain the stop 76 in the sleeve 50. As shown in Figure 2, the bar end B is received between the spring fingers 54 and 56 of the sleeve 50 and abuts the forward end of the stop 76.

When the pusher structure is moving the collet to the right, to grip the bar end, as viewed in Figure 2, the inertia of the bar B will move the stop 76, bearing 70, stop 66 and bearing 64 to the left, as viewed in Figure 2. The amount of this movement is limited by the axial length of the elongated apertures 74 formed in the collet sleeve 50 in which the ends of pin 72 carried by the stop 66 are received. The purpose of the pin and slots is to minimize the wear between the collet structure and the head portion 62 of the rod 21. The amount of free play or movement between the head 62 and the collet nut 58 is such that when the thrust of the bar B is transmitted to the internal components of the collet, the pin 72 will limit the movement to the left, as viewed in Figure 2, so that the rod head 62 is still spaced from the right-hand or inner end of the collet nut 58 whereby any wear between the head 62 of the rod 21 and the inner end of the collet nut 58 is eliminated. By reason of the bearings 64, 70, the bar B and stop 76 are free to rotate within the collet sleeve 50 and also due to the bearing 64 the sleeve 50 and bar B are free to rotate on the pusher rod 21.

When the pusher structure is moving the bar B to the right, as viewed in Figure 2, a tight axial or endwise connection is established from the head end of the rod 62 through the bearing 64, stop 66, bearing 70 and stop 76 to the rear end of the bar B. This connection is a tight or endwise connection in that no endwise movement may take place between the elements but rotative motion will be permitted by reason of the balls 64 and 70. Pin 72 of the stop 66 permits free endwise movement of the sleeve 50 on the rod 21 and the bar B. The length of the slots 74, however, is of such a dimension as to prevent the rear face of the head end 62 of the rod 21 from coming into contact with the inner end of the collect nut 58, as above described, and for the same reason the internal shoulder 78 formed at the forward end of the collet sleeve 50 is prevented from coming in contact with the enlarged portion 77 of the stop 76 whereby to prevent wear between the enlarged portion 77 and the shoulder 78.

The fingers 54 and 56 are formed at their forward portion with an internal bar gripping portion 80 which grips the end of the bar B. Intermediate the bar gripping portion and the shoulder 78 is a portion 82 having a diameter greater than the portion 80. The portion 82 serves to prevent wear on the extreme inner end of the bar stock B whereby when the pusher is moved to the left, as viewed in Figure 2, the bar remnant will be retracted with the pusher regardless of the wear that may have taken place on the bar diameter adjacent the bar gripping portion 80.

As is obvious, the diameter of the head portion 67 of the stop 66 regulates the amount of closing or radially inward movement of the spring fingers 54 and 56 whereby stops 66 with different size head portions 67 may be inserted in the sleeve to regulate the amount of gripping pressure or tension applied by the fingers 54 and 56 to the stock bar B.

What we claim is:

1. A bar stock pusher for engaging and gripping bar stock received in a bar feeding machine, said pusher being journalled on a pusher rod formed with an enlarged pusher head, said pusher comprising a sleeve formed at its forward end with a pair of radially yieldable spring fingers and an internal annular shoulder, a first stop positioned rearwardly of said shoulder, an antifriction member positioned rearwardly of said stop, a second stop positioned rearwardly of said first stop and being formed with a bearing seat in which said anti-friction member is received, and a second anti-friction member being received between said enlarged pusher head and said second stop.

2. A collet type stock pusher for receiving and gripping the end portion of bar stock for advancement and retraction with said pusher, said collet including a sleeve having a pair of radially spaced apart yieldable spring fingers having internal bar engaging surfaces for receiving and gripping the bar stock end portion therebetween, a stock stop positioned in said sleeve a spaced distance rearwardly from said bar engaging surfaces and the portions of said fingers intermediate said bar engaging surfaces and said stock stop being undercut to form an internal annular shoulder and means for journalling said collet on a pusher rod.

3. A stock bar pusher structure comprising a sleeve formed at its forward end with spring fingers adapted to yieldingly grip the rear end of a stock bar, the rear end on said sleeve being rotatably mounted on a pusher rod, said rod and sleeve having means co-operable to limit forward axial movement of the sleeve relative to the rod, stop means mounted in the sleeve intermediate the ends thereof, said stop means being operable to limit rearward axial movement of the sleeve relative to the rod and rearward axial movement of the stock bar relative to the sleeve.

4. A stock bar pusher structure comprising a sleeve formed at its forward end with spring fingers adapted to yieldingly grip the rear end of a stock bar, the rear end of said sleeve being rotatably mounted on a pusher rod, said rod and sleeve having means co-operable to limit forward axial movement of the sleeve relative to the rod, stop means mounted in the sleeve intermediate the ends thereof, said stop means being operable to limit rearward axial movement of the sleeve relative to the rod and rearward axial movement of the stock bar relative to the sleeve and having limited axial movement relative to the sleeve.

References Cited in the file of this patent

UNITED STATES PATENTS

| | | |
|---|---|---|
| 1,597,404 | Crossley | Aug. 24, 1926 |
| 2,334,272 | Mariotte | Nov. 16, 1943 |
| 2,339,712 | Mariotte | Jan. 18, 1944 |
| 2,626,452 | Gridley | Jan. 27, 1953 |